(12) United States Patent
Archer et al.

(10) Patent No.: US 9,482,195 B2
(45) Date of Patent: Nov. 1, 2016

(54) FUEL SUPPLY SYSTEM FOR INTERNAL COMBUSTION ENGINE AND METHODS OF USING THE SAME

(71) Applicant: GM Global Technology Operations LLC, Detroit, MI (US)

(72) Inventors: Mark D. Archer, Carlton North (AU); Nicholas Carter, Fairfield (AU); Richard W. Hurley, Glen Waverly (AU); Jon D. Edsell, North Warrandyte (AU)

(73) Assignee: GM Global Technology Operations LLC, Detroit, MI (US)

( * ) Notice: Subject to any disclaimer, the term of this patent is extended or adjusted under 35 U.S.C. 154(b) by 490 days.

(21) Appl. No.: 13/804,548

(22) Filed: Mar. 14, 2013

(65) Prior Publication Data

US 2014/0261327 A1 Sep. 18, 2014

(51) Int. Cl.
*F02M 41/00* (2006.01)
*F02M 21/02* (2006.01)
*F02M 21/06* (2006.01)

(52) U.S. Cl.
CPC ......... *F02M 41/00* (2013.01); *F02M 21/0218* (2013.01); *F02M 21/0287* (2013.01); *F02M 21/06* (2013.01); *Y02T 10/32* (2013.01)

(58) Field of Classification Search
CPC ............. F02D 19/022; F02D 19/0665; F02D 19/087; F02D 19/024; F02D 41/0027; F02D 19/027; F02D 19/0628; F02D 19/0642; F02D 19/0647; F02D 19/0684; F02M 17/22; F02M 21/0221; F02M 25/08; F02M 31/20; F02M 21/0212; F02M 21/0281; F02M 21/0287; F02M 25/089; F02M 31/18; F02M 41/00; F04C 14/24; Y02T 10/32; Y02T 10/121; Y02T 10/126
USPC .............. 123/304, 41.05, 41.13, 41.19, 41.2, 123/41.42, 41.44, 41.45, 41.54, 445, 456, 123/457, 459, 461, 462, 468, 469, 470, 471, 123/495, 511, 512, 516, 514, 518, 522, 525, 123/526, 527, 540, 541, 553, 575, 446, 528, 123/542, 563, 557, 497, 464, 543, 549; 60/651; 62/323.1, 48.1, 48.2, 48.4, 62/50.2; 417/295; 165/285, 286, 287, 294, 165/302, 41, 42, 43, 44, 59, 60, 61, 66; 137/585; 220/560.4, 560.7, 560.11, 220/581, 582, 583, 584, 585, 586, 587, 588, 220/589, 590, 591, 592, 592.01, 4.14
See application file for complete search history.

(56) References Cited

U.S. PATENT DOCUMENTS 3,026,862 A * 3/1962 Fisher ................... F02M 21/00
123/540
3,885,547 A * 5/1975 Doepke .................. B60K 15/04
123/198 D (Continued)

FOREIGN PATENT DOCUMENTS

EP 1785618 B1 1/2009

OTHER PUBLICATIONS

Joule-Thomson effect, from Wikipedia, http://en.wikipedia.org/wiki/Joule-Thomson_effect; 7 pages.

(Continued)

*Primary Examiner* — Hung Q Nguyen
*Assistant Examiner* — John Bailey
(74) *Attorney, Agent, or Firm* — BrooksGroup

(57) ABSTRACT

A number of variations of the invention may include a fuel supply system for an internal combustion engine and/or method, wherein heat is exchanged from gaseous fuel in a gaseous fuel line and at least one of a liquid fuel in a liquid fuel feed line or a liquid fuel return line which are connected to an injection fuel rail of an internal combustion engine. In a number of variations, a regulator or throttling valve is provided in the gaseous fuel line to expand gas flowing therein and reduce the temperature of the gas to further cool the liquid fuel flowing in the liquid fuel feed line or the liquid fuel return line. Another variation may include a method comprising exchanging heat from gaseous fuel in a gaseous fuel line and a liquid fuel in a liquid fuel feed line or a liquid fuel return line which are connected to an injection fuel rail of an internal combustion engine. Another variation may further include throttling the flow through the gaseous fuel line to adiabatically expand the gas flowing and reduce the temperature of the gas to further cool the liquid fuel flowing in the liquid fuel feed line or the liquid fuel return line.

35 Claims, 1 Drawing Sheet

(56) References Cited

U.S. PATENT DOCUMENTS

| | | | | |
|---|---|---|---|---|
| 3,919,852 A * | 11/1975 | Jones | F25J 1/0025 60/651 |
| 4,236,899 A * | 12/1980 | Gulden | C01B 3/38 123/3 |
| 4,412,521 A * | 11/1983 | Silva, Jr. | F02D 19/12 123/522 |
| 4,524,747 A * | 6/1985 | van den Wildenberg | F02M 21/06 123/527 |
| 4,836,173 A * | 6/1989 | Stires, Jr. | F02M 17/22 123/522 |
| 4,846,135 A * | 7/1989 | Tiphaine | F02M 25/08 123/518 |
| 4,907,630 A * | 3/1990 | Kulikowski | B67D 7/46 141/311 R |
| 5,251,603 A * | 10/1993 | Watanabe | F02M 31/20 123/541 |
| 5,360,139 A * | 11/1994 | Goode | F17C 5/007 141/18 |
| 5,375,580 A * | 12/1994 | Stolz | F02B 29/0443 123/527 |
| 5,377,647 A * | 1/1995 | Jones | F02D 19/027 123/527 |
| 5,441,031 A * | 8/1995 | Kiyomiya | F02M 25/08 123/518 |
| 5,479,906 A * | 1/1996 | Collie | F02M 21/0212 123/304 |
| 5,482,024 A * | 1/1996 | Elliott | F02M 13/08 123/516 |
| 5,540,208 A * | 7/1996 | Kikutani | F02B 43/00 123/518 |
| 5,673,673 A * | 10/1997 | Beck | F02D 19/10 123/527 |
| 5,690,077 A * | 11/1997 | Ofner | F02M 21/0212 123/27 GE |
| 5,797,378 A * | 8/1998 | Kato | F02B 61/045 123/198 E |
| 5,881,698 A * | 3/1999 | Tuckey | F04C 14/24 123/497 |
| 6,155,239 A * | 12/2000 | Dykstra | B60K 15/00 123/522 |
| 6,843,236 B1 * | 1/2005 | Shetley | F02D 19/0605 123/525 |
| 6,866,092 B1 * | 3/2005 | Molivadas | F01L 3/12 123/41.2 |
| 7,240,492 B2 * | 7/2007 | Johnson | F25B 19/005 60/649 |
| 7,484,500 B2 * | 2/2009 | Terada | F02M 25/089 123/516 |
| 7,841,322 B2 * | 11/2010 | Bach | F02B 29/0418 123/480 |
| 7,980,230 B2 * | 7/2011 | Smart | F02M 31/10 123/514 |
| 8,020,537 B2 * | 9/2011 | Smart | F02M 31/10 123/514 |
| 8,037,849 B1 * | 10/2011 | Staroselsky | F02M 21/08 123/1 A |
| 8,333,171 B2 * | 12/2012 | Lund | F02D 19/0647 123/1 A |
| 8,783,281 B2 * | 7/2014 | Carter | F02M 21/0221 123/304 |
| 9,004,045 B2 * | 4/2015 | Seydell | B60K 15/035 123/541 |
| 2002/0040706 A1 * | 4/2002 | Katayama | F02B 61/045 123/516 |
| 2002/0112479 A1 * | 8/2002 | Keefer | F02B 43/10 60/651 |
| 2004/0173191 A1 * | 9/2004 | Uitenbroek | F02B 43/12 123/527 |
| 2005/0145223 A1 * | 7/2005 | Nozaki | F02D 33/006 123/516 |
| 2008/0053416 A1 * | 3/2008 | Hines | F02D 41/003 123/557 |
| 2008/0190117 A1 * | 8/2008 | Lee | F17C 3/00 62/47.1 |
| 2008/0308175 A1 * | 12/2008 | Lee | F17C 13/004 141/11 |
| 2009/0126704 A1 * | 5/2009 | Lee | B63B 25/14 123/527 |
| 2010/0314074 A1 * | 12/2010 | Sikora | F02C 1/02 165/104.11 |
| 2011/0168133 A1 * | 7/2011 | Pursifull | F02M 37/0064 123/495 |
| 2011/0290203 A1 * | 12/2011 | Pursifull | F02D 19/0605 123/41.08 |
| 2012/0060935 A1 * | 3/2012 | Carter | F02M 21/0221 137/14 |
| 2012/0186560 A1 * | 7/2012 | Lund | F02D 19/0642 123/495 |
| 2013/0255646 A1 * | 10/2013 | Ulrey | F02D 41/0027 123/527 |
| 2013/0333666 A1 * | 12/2013 | Ebner | F02D 19/0605 123/445 |
| 2014/0026869 A1 * | 1/2014 | Zhou | F02M 31/20 123/541 |
| 2014/0209070 A1 * | 7/2014 | Gleeson | F02M 21/06 123/543 |

OTHER PUBLICATIONS

Thermal Model LPG Fuel System: Analysis & Results ; Dr. Gewen Fang ; Synthesis & Analysis, Holden Powertrain Engineering ; Aug. 23, 2010 ; 41 pages.

* cited by examiner

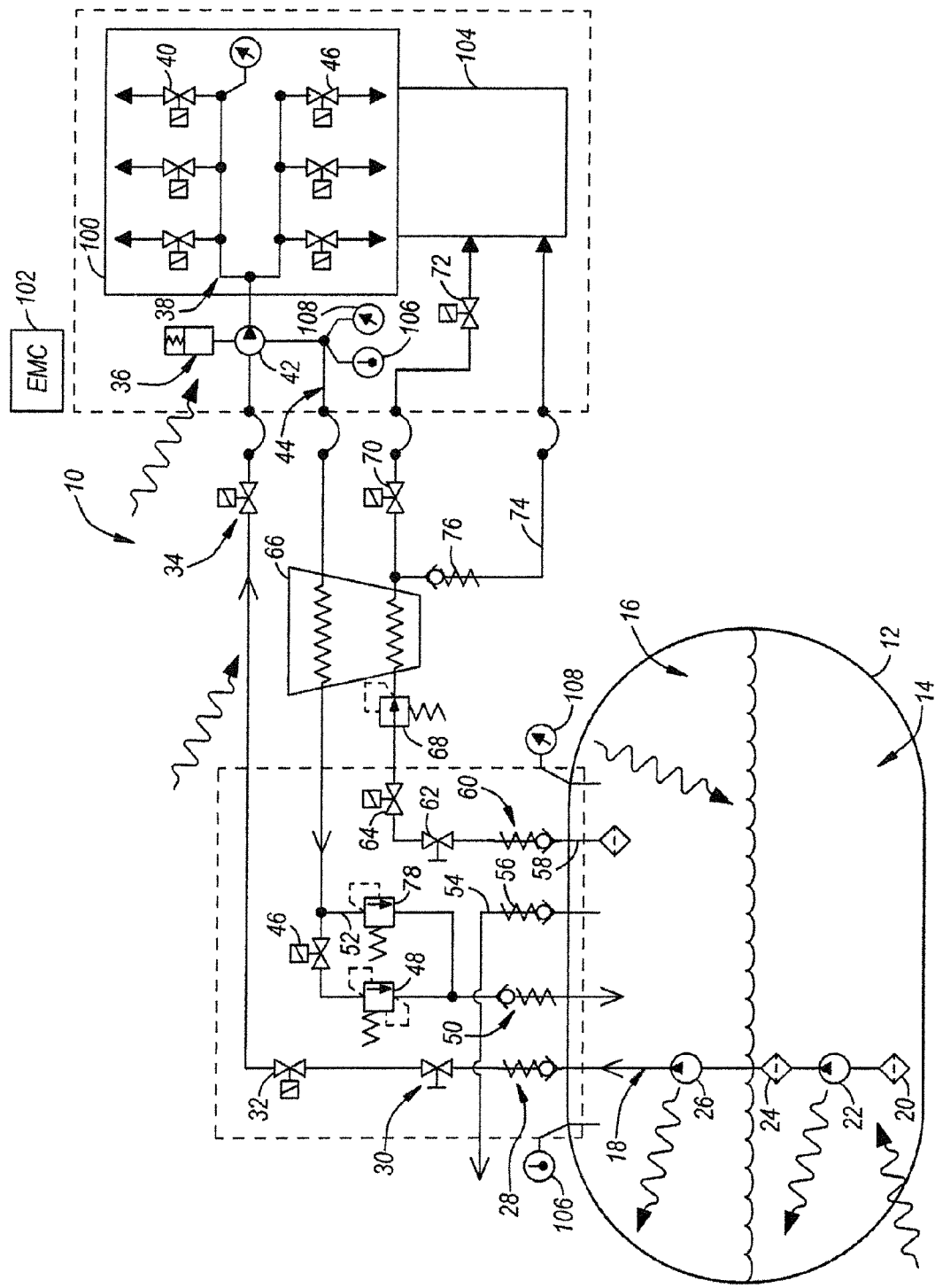

FUEL SUPPLY SYSTEM FOR INTERNAL COMBUSTION ENGINE AND METHODS OF USING THE SAME

TECHNICAL FIELD

The field to which the disclosure generally relates to includes fuel supply systems for injecting multi-phase fuel into internal combustion engines.

BACKGROUND

Fuels which are normally a vapor at room temperature and atmospheric pressure may be injected into combustion engines in the liquid state from a low temperature storage tank. There are a number of reasons why it is desirable to inject a liquid into the induction system for a combustion engine, including the fact that liquid fuels are much easier to meter accurately and to deliver, and also because liquid fuels have a higher energy density for each injection in comparison to fuels injected in the gas or vapor state. However, combustion engines utilize exothermic reactions which heat the engine and associated components including the fuel supply rail utilized to deliver liquid fuel to injectors for the combustion engine chambers. Further, combustion engines may be operated under conditions wherein the ambient temperature is much greater than room temperature further increasing the likelihood that fuel being delivered through the fuel supply rail will be vaporized prior to injecting into the combustion engine. Still further, the operating conditions and duration of operation of a vehicle may be such that pressure in a supply tank may increase over time and vapor may have to be discharged to the atmosphere to reduce pressure in the storage tank.

Refueling the low temperature fuel tank may be difficult and slow because the refueling adds heat to the tank and the addition of liquid fuel causes the pressure in the tank to increase which makes refueling slower and requiring more energy to accomplish.

Persons skilled in the art continue to work on developing improvements to such fuel supply systems for combustion engines.

SUMMARY OF ILLUSTRATIVE VARIATIONS OF THE INVENTION

A number of variations of the invention may include a fuel supply system for an internal combustion engine and/or method, wherein heat is exchanged from gaseous fuel in a gaseous fuel line and at least one of a liquid fuel in a liquid fuel feed line or a liquid fuel return line which are connected to an injection fuel rail of an internal combustion engine.

In a number of variations, a regulator or throttling valve is provided in the gaseous fuel line to expand gas flowing therein and reduce the temperature of the gas to further cool the liquid fuel flowing in the liquid fuel feed line or the liquid fuel return line.

A number of other variations may include a method comprising exchanging heat from gaseous fuel in a gaseous fuel line and a liquid fuel in a liquid fuel feed line or a liquid fuel return line which are connected to an injection fuel rail of an internal combustion engine.

A number of other variations may further comprise throttling the flow through the gaseous fuel line to adiabatically expand the gas flowing and reduce the temperature of the gas to further cool the liquid fuel flowing in the liquid fuel feed line or the liquid fuel return line.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

The following description of the variations is merely illustrative in nature and is in no way intended to limit the invention, its application, or uses.

FIG. 1 is a schematic illustration of a product or fuel supply system for an internal combustion engine according to one embodiment of the invention.

DETAILED DESCRIPTION OF ILLUSTRATIVE VARIATIONS OF THE INVENTION

The following description of the variations is merely illustrative in nature and is in no way intended to limit the invention, its application, or uses.

A number of variations of the invention may include a fuel supply system for an internal combustion engine and/or method, wherein heat may be exchanged from gaseous fuel in a gaseous fuel line and at least one of a liquid fuel in a liquid fuel feed line or a liquid fuel return line which may be connected to an injection fuel rail of an internal combustion engine. In a number of variations, a regulator or throttling valve may be provided in the gaseous fuel line to expand gas flowing therein and reduce the temperature of the gas to further cool the liquid fuel flowing in the liquid fuel feed line or the liquid fuel return line.

A number of variations are illustrated in FIG. 1, and may include a product or fuel supply system for an internal combustion engine 10 which may include a fuel tank 12 having a liquid fuel 14, such as, but not limited to, liquefied petroleum gas (LPG), propane, hydrocarbon fuels or other fuels 16 contained therein. In a number of variations, the fuel tank 12 may be constructed and arranged and operated so the fuel therein is at a temperature below 40 degree C., for example, but not limited to, a temperature less than −40 degrees C., and a pressure less than 15 bar. A liquid fuel feed line 18 may be provided and may include a strainer 20 at one end. A first fuel pump 22 may be provided downstream of the strainer 20. A fuel filter 24 may be provided downstream of the first fuel pump 22. A second fuel pump 26 constructed and arranged to operate at high pressures may be provided downstream of the fuel filter 24. The liquid fuel feed line 18 may exit the liquid fuel tank 12 and an excess flow valve 28 provided upstream of a service valve 30. A first automatic fuel shutoff valve 32 may be provided downstream of a service valve 30 and a second automatic fuel shutoff valve 34 downstream thereof. A high pressure fuel pump 36 may be connected to the liquid fuel feed line 18 adjacent a liquid fuel rail 38. The liquid fuel rail 38 may be constructed and arranged to deliver fuel into combustion chambers of the internal combustion engine 100. A plurality of liquid fuel injectors 40 may be connected to the liquid fuel rail 38 and constructed and arranged to inject fuel into the combustion chambers. A control valve 42 may be connected to the liquid fuel feed line 18 and a liquid fuel return line 44 to control the flow of fuel into the liquid fuel rail 38 and the liquid fuel return line 44.

A feed pressure control valve 46 may be connected to the liquid fuel return line 44 and a first regulator 48 connected downstream of the feed pressure control valve 46. A check valve 50 may be provided in the liquid fuel return line 44 prior to the liquid fuel return line 44 being connected to entering the fuel tank 12. A bypass line 52, including a second regulator 78 connected thereto, may be connected to the liquid fuel return line 44 at one end upstream of the feed pressure control valve 46 and at the other end downstream of the first regulator 48. A vent line 54 may be connected to the liquid fuel tank 12 to vent gaseous fuel to the atmosphere as desired. A pressure relief valve 56 may be connected to the vent line 54 to control such release. A gaseous line 58 may be connected to the fuel tank 12 to remove gas therefrom. In one embodiment, the gaseous line 58 may be connected to the internal combustion engine 100 to deliver gaseous fuel thereto. However, the gaseous line 58 may be connected to other components or may be vented to the atmosphere as desired. An excess flow valve 60 may be connected to the gaseous line 58 at a location relatively close to the fuel tank 12. A service valve 62 may be provided downstream of the excess flow valve 60 and a third automatic shutoff valve 64 provided downstream of a service valve 62.

A heat exchanger 66 may be provided and constructed and arranged so that the gaseous line 58 is connected thereto and at least one of the liquid fuel feed line 18 or the liquid fuel return line 44 is connected to the heat exchanger 66. Any of a variety of heat exchangers may be utilized including, but not limited to, shell and tube type exchangers, plate type exchangers and concentric tube type heat exchangers. In a number of variations, the heat exchanger 66 is a shell and tube type and the gas is expanded to flow through the shell side of the exchanger and the liquid fuel may flow through the tube side. The heat exchanger may be operated in a counter-flow or concurrent flow configuration.

A regulator or throttling valve 68 may be provided upstream of the heat exchanger 66. The gaseous line 58 and the throttling valve or regulator 68 may be constructed and arranged to expand the gas flowing in the gaseous line 58 cooling the gas and lowering the temperature thereof to provide a cooled gas stream. The throttling valve or regulator 68 and the heat exchanger 66 may be separate components or may be combined together in a single device. A fourth automatic fuel shutoff valve 70 may be provided downstream of the heat exchanger 66 and a gaseous flow control valve 72 may be provided downstream of the fourth automatic fuel shutoff valve 70. In a number of variations, the gaseous line 58 may be connected to an oxidant or air inlet manifold 104 of the combustion engine 100. Alternatively, the gaseous line 58 may be connected to one or more vapor injectors (not shown) to deliver gaseous fuel to the combustion chambers of the combustion engine 100. In a number of variations, a vent line 74 may be connected to the gaseous line 58, for example, downstream of the heat exchanger 66. The vent line 74 may be connected to the combustion engine 100 to deliver gaseous fuel for combustion. In a number of variations, the vent line 74 may be connected to an oxidant or air intake manifold 104 of the combustion engine 100. A pressure relief valve 76 may be connected to the vent line 74 to control the flow of gas through the vent line 74. Temperature sensors 106 and pressure sensors 108 may be provided and connected to the fuel tank 12 and various lines 18, 44 to determine the temperature and pressure of fuel therein. An electronic control module (EMC) 102 may be provided and connected to the sensors 106, 108 and components of the system to control the same as desired in response to operating conditions of the system 10.

A regulator or throttling valve 68 need not be used in all variations. However, variations where the regulator or throttling valve 68 is utilized, such a system exploits both (1) the latent heat of vaporization of the fuel and (2) the Joule-Thomson effect (gas cooling due to adiabatic expansion) to achieve a high level of tank cooling while drawing off only a relatively small amount of LPG in gaseous form. Such a system may utilize relatively available canister vapor purge hardware and software as desired.

A number of variations may include a method of refueling a fuel tank of a fuel system for a combustion engine including providing a liquid fuel delivery line connected to a fuel tank to draw liquid fuel therefrom, a gaseous fuel line connected to the fuel tank to remove gaseous fuel therefrom and a heat exchanger connected to the liquid fuel delivery line and the gaseous fuel line, and refueling the fuel tank with liquid fuel, and selectively removing gas from the fuel tank during refueling and through the gaseous line, and removing liquid from the fuel tank through the liquid fuel delivery line so that heat is exchanged between the gas flowing in the gaseous fuel line and the liquid fuel flowing in the liquid fuel delivery line. In a number of variations, the liquid fuel delivery line is constructed and arranged to flow the liquid fuel after heat exchange back into the tank. In a number of variations, the liquid fuel delivery line is constructed and arranged to flow the liquid fuel through a fuel rail connected to a combustion engine and after heat exchange back into the tank. In a number of variations, the combustion engine may be operated during the refueling.

A number of variations may include a method of operating a fuel supply system for an internal combustion engine. One variation includes a method of delivering liquid fuel through a liquid fuel feed line to an injection fuel rail on an internal combustion engine and back to the fuel tank through a liquid fuel return line and selectively removing gas from the fuel tank through a gaseous line and exchanging heat from gas flowing through the gaseous fuel line with liquid flowing in one of the liquid fuel feed line or the liquid fuel return line. In one embodiment, the method further includes expanding the gas flowing in the gaseous line to cool the gas prior to exchanging heat.

A number of variations of the invention may include a method including controlling the temperature and pressure of a fuel tank, including removing liquid from the gas tank through a liquid fuel feed line to a liquid injection fuel rail of an internal combustion engine and back to the fuel tank through a liquid fuel return line, and when the temperature and/or pressure of the gas tank exceeds a predetermined level, selectively removing gas from the fuel tank through a gas line and exchanging heat from gas flowing through the gas line with liquid fuel flowing through at least one of the liquid fuel feed line or the liquid fuel return line. Another variation includes selectively expanding the gas flowing through the gaseous line to cool the gas therein prior to exchanging heat with liquid flowing through the liquid fuel feed line or the liquid fuel return line. Another variation includes delivering gaseous fuel removed from the fuel tank to the internal combustion engine for combustion thereof.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a system comprising: a storage tank constructed and arranged to store a liquid fuel therein, wherein the fuel is a gas at standard room temperature and pressure; a combustion engine having a plurality of combustion chambers, a liquid injection fuel rail connected to the combustion engine, and a plurality of liquid fuel injectors coupled to the liquid injection fuel rail and constructed and arranged to inject liquid fuel into the combustion chambers of the combustion engine; a liquid fuel feed line constructed and arranged to have a portion thereof extending into the storage tank a distance sufficient to be submerged in the liquid fuel when the liquid fuel is carried in the storage tank and connected to the liquid injection fuel rail to deliver the liquid fuel thereto; a liquid fuel return line connected to the liquid injection fuel rail and the storage tank to recirculate the liquid fuel from the liquid injection fuel rail back into the storage tank; a gaseous line connected to the storage tank to remove the gas from the storage tank and a throttling valve connected to the gaseous line, wherein the gaseous line and the throttling valve are constructed and arranged to expand the gas flowing through the gaseous line to reduce the temperature of the gas and to provide a cooled gas stream; a gaseous line connected to a heat exchanger, and at least one of the liquid fuel feed line or liquid fuel return line connected to the heat exchanger so that heat is exchanged between the liquid fuel and the liquid fuel feed line or liquid fuel return line and the cooled gas stream.

Variation 2 may include a system as set forth in Variation 1, wherein the gaseous line is connected to the combustion engine to deliver the gas to the combustion engine.

Variation 3 includes a system as set forth in any of Variations 1-2, wherein the gaseous line is connected to an oxidant inlet manifold connected to the combustion engine to deliver the gas into the combustion engine.

Variation 4 includes a system as set forth in any of Variations 1-3, wherein the liquid fuel return line is connected to the heat exchanger.

Variation 5 includes a system as set forth in any of Variations 1-4 further comprising one or more vapor injectors connected to the combustion chambers and to the gaseous line to deliver the gas into the combustion chambers.

Variation 6 includes a system as set forth in any of Variations 1-5 further comprising a vent line connected to the gaseous line.

Variation 7 includes a system as set forth in any of Variations 1-6, wherein the vent line is connected to the combustion engine to deliver the gas thereto.

Variation 8 includes a system as set forth in any of Variations 1-7 wherein the vent line is connected to an oxidant inlet manifold connected to the engine combustion chambers.

Variation 9 includes a system as set forth in any of Variations 1-8 further comprising a pressure regulator connected to the gaseous line to regulate the pressure therein.

Variation 10 includes a system as set forth in any of Variations 1-9 further comprising a vent line connected to the storage tank to vent the gas therefrom to the atmosphere.

Variation 11 includes a system as set forth in any of Variations 1-10, wherein the regulator is upstream of the heat exchanger.

Variation 12 may include a system comprising: a storage tank connected and arranged to store a liquid fuel therein, wherein the liquid fuel is a gas at standard room temperature and pressure; a combustion engine having a plurality of combustion chambers defined therein, a liquid injection fuel rail connected to the combustion engine and a plurality of liquid fuel injectors coupled to the liquid injection fuel rail and constructed and arranged to inject liquid fuel into the combustion chambers of the combustion engine; a liquid fuel feed line constructed and arranged so that a portion extends into the storage tank a distance sufficient to be submerged in the liquid fuel when liquid fuel is carried in the storage tank and connected to the liquid injection fuel rail to deliver liquid fuel thereto; a liquid return line connected to the liquid injection fuel rail and to the storage tank to recirculate the liquid fuel from the liquid injection fuel rail back into the storage tank; a gaseous line connected to the storage tank to remove the gas therefrom; a heat exchanger having at least one of the liquid fuel feed line or the liquid fuel return line connected thereto, and wherein the gaseous line is connected to the heat exchanger so that heat is exchanged between the liquid fuel in the liquid fuel line or the liquid fuel return line and the gas flowing in the gaseous line.

Variation 13 may include a system as set forth in Variation 12, wherein the gaseous line is connected to the combustion engine to deliver the gas to the combustion engine.

Variation 14 includes a system as set forth in any of Variations 1-13, and further comprising a regulator connected to the gaseous line upstream of the heat exchanger and constructed and arranged to expand and cool the gas flowing in the gaseous line.

Variation 15 may include a method comprising exchanging heat from a gaseous fuel in a gaseous fuel line and a liquid fuel in a liquid fuel feed line or a liquid fuel return line which are connected to an injection fuel rail of an internal combustion engine.

Variation 16 may include a method as set forth in Variation 15 further comprising throttling the flow through the gaseous fuel line to adiabatically expand the gaseous fuel and reduce the temperature of the gaseous fuel to further cool the liquid fuel flowing in the liquid fuel feed line or the liquid fuel return line.

Variation 17 may include a method of refueling a fuel tank of a fuel system for a combustion engine comprising: providing a liquid fuel delivery line connected to a fuel tank constructed and arranged to draw liquid fuel therefrom, a gaseous fuel line connected to the fuel tank to remove a gaseous fuel therefrom and a heat exchanger connected to the liquid fuel delivery line and the gaseous fuel line; refueling the fuel tank with the liquid fuel, and selectively removing the gaseous fuel from the fuel tank during refueling and through the gaseous line, and removing the liquid fuel from the fuel tank through the liquid fuel delivery line so that heat is exchanged between the gaseous fuel flowing in the gaseous fuel line and the liquid fuel flowing in the liquid fuel delivery line.

Variation 18 may include a method as set forth in Variation 17 wherein the liquid fuel delivery line is constructed and arranged to flow the liquid fuel after heat exchange back into the fuel tank.

Variation 19 includes a system as set forth in any of Variations 1-18 wherein the liquid fuel delivery line is constructed and arranged to flow the liquid fuel through a fuel rail connected to a combustion engine and after heat exchange back into the fuel tank.

Variation 20 includes a system as set forth, in any of Variations 1-19 further comprising operating the combustion engine during the refueling.

Variation 21 may include a method of operating a fuel supply system for an internal combustion engine comprising: delivering a liquid fuel through a liquid fuel feed line to an injection fuel rail on an internal combustion engine and back to a fuel tank through a liquid fuel return line and selectively removing gas from the fuel tank through a gaseous line and exchanging heat from gas flowing through the gaseous fuel line with liquid flowing in one of the liquid fuel feed line or the liquid fuel return line.

Variation 22 may include a method as set forth in Variation 21 further comprising adiabatically expanding the gas flowing in the gaseous line to cool the gas prior to exchanging heat.

Variation 23 may include a method comprising controlling the temperature and pressure of a liquid gas tank, including removing a liquid fuel from the liquid gas tank through a liquid fuel feed line to a liquid injection fuel rail of an internal combustion engine and back to the liquid gas tank through a liquid fuel return line, and when the temperature and/or pressure of the liquid gas tank exceeds a predetermined level, selectively removing a gas from the liquid gas tank through a gas line and exchanging heat from the gas flowing through the gas line with the liquid fuel flowing through at least one of the liquid fuel feed line of the liquid fuel return line.

Variation 24 may include a method as set forth in Variation 23 further comprising selectively expanding the gas flowing through the gaseous line to cool the gas therein prior to exchanging heat with liquid fuel flowing through the liquid fuel feed line or the liquid fuel return line.

Variation 25 includes a system as set forth in any of Variations 23-24 further comprising delivering the gas removed from the liquid gas tank to the internal combustion engine and for combusting the gas in the combustion engine.

Variation 26 includes a method as set forth in any of Variations 16-25 carried out using a system as set forth in any of Variations 1-15.

What is claimed is:

1. A system comprising:
   a storage tank constructed and arranged to store a liquid fuel therein, wherein the fuel is a gas at standard room temperature and pressure;
   a combustion engine having a plurality of combustion chambers, a liquid injection fuel rail connected to the combustion engine, and a plurality of liquid fuel injectors coupled to the liquid injection fuel rail;
   a liquid fuel feed line constructed and arranged to have a portion thereof extending into the storage tank a distance sufficient to be submerged in the liquid fuel when the liquid fuel is carried in the storage tank and connected to the liquid injection fuel rail to deliver the liquid fuel thereto;
   a liquid fuel return line connected to the liquid injection fuel rail and the storage tank to recirculate the liquid fuel from the liquid injection fuel rail back into the storage tank;
   a gaseous line connected to the storage tank to remove the gas from the storage tank and a throttling valve connected to the gaseous line, wherein the gaseous line and the throttling valve are constructed and arranged to expand the gas flowing through the gaseous line to reduce the temperature of the gas and to provide a cooled gas stream;
   wherein the gaseous line is connected to a heat exchanger, and at least one of the liquid fuel feed line or liquid fuel return line is connected to the heat exchanger so that heat is exchanged between the liquid fuel in the liquid fuel feed line or liquid fuel return line and the cooled gas stream wherein the throttling valve is directly upstream of the heat exchanger to provide the cooled gas stream entering the heat exchanger.

2. A system as set forth in claim 1, wherein the gaseous line is connected to the combustion engine to deliver the gas to the combustion engine.

3. A system as set forth in claim 2, wherein the gaseous line is connected to an oxidant inlet manifold connected to the combustion engine to deliver the gas into the combustion engine.

4. A system as set forth in claim 1, wherein the liquid fuel return line is connected to the heat exchanger.

5. A system as set forth in claim 1 further comprising one or more vapor injectors.

6. A system as set forth in claim 1 further comprising a vent line connected to the gaseous line.

7. A system as set forth in claim 6, wherein the vent line is connected to the combustion engine to deliver the gas thereto.

8. A system as set forth in claim 6, wherein the vent line is connected to an oxidant inlet manifold connected to the engine combustion chambers.

9. A system as set forth in claim 1 further comprising a pressure regulator connected to the gaseous line to regulate the pressure therein.

10. A system as set forth in claim 1 further comprising a vent line directly connected to the storage tank to vent the gas therefrom to the atmosphere.

11. A system as set forth in claim 9, wherein the regulator is upstream of the heat exchanger.

12. A system comprising:
    a storage tank connected and arranged to store a liquid fuel therein, wherein the liquid fuel is a gas at standard room temperature and pressure;
    a combustion engine having a plurality of combustion chambers defined therein, a liquid injection fuel rail and a plurality of liquid fuel injectors coupled to the liquid injection fuel rail;
    a liquid fuel feed line constructed and arranged so that a portion extends into the storage tank a distance sufficient to be submerged in the liquid fuel when liquid fuel is carried in the storage tank and connected to the liquid injection fuel rail to deliver liquid fuel thereto;
    a liquid return line connected to the liquid injection fuel rail and to the storage tank to recirculate the liquid fuel from the liquid injection fuel rail back into the storage tank;
    a gaseous line connected to the storage tank to remove the gas therefrom;
    a heat exchanger having at least one of the liquid fuel feed line or the liquid fuel return line connected thereto, and wherein the gaseous line is connected to the heat exchanger so that heat is exchanged between the liquid fuel in the liquid fuel line or the liquid fuel return line and the gas flowing in the gaseous line and wherein the gaseous line contains a throttling valve directly upstream of the heat exchanger constructed and arranged to expand the gas flowing in the gaseous line thereby cooling the gas and lowering the temperature thereof to provide a cooled gas stream entering the heat exchanger.

13. A system as set forth in claim 12, wherein the gaseous line is connected to the combustion engine to deliver the gas to the combustion engine.

14. A system as set forth in claim 13 further comprising a regulator connected to the gaseous line upstream of the heat exchanger and constructed and arranged to expand and cool the gas flowing in the gaseous line.

15. A method comprising exchanging heat from a gaseous fuel in a gaseous fuel line and a liquid fuel in a liquid fuel feed line or a liquid fuel return line which are connected to an injection fuel rail of an internal combustion engine wherein the gaseous fuel line contains a throttling valve directly upstream of a heat exchanger constructed and arranged to expand the gas flowing in the gaseous fuel line thereby cooling the gas and lowering the temperature thereof to provide a cooled gas stream entering the heat exchanger.

16. A method as set forth in claim 15 further comprising throttling the flow through the gaseous fuel line to adiabatically expand the gaseous fuel and reduce the temperature of the gaseous fuel to further cool the liquid fuel flowing in the liquid fuel feed line or the liquid fuel return line.

17. A method of refueling a fuel tank of a fuel system for a combustion engine comprising:
provided a liquid fuel delivery line connected to a fuel tank constructed and arranged to draw liquid fuel therefrom, a gaseous fuel line connected to the fuel tank to remove a gaseous fuel therefrom and a heat exchanger connected to the liquid fuel delivery line and the gaseous fuel line wherein the gaseous fuel line contains a throttling valve directly upstream of the heat exchanger constructed and arranged to expand the gas flowing in the gaseous fuel line thereby cooling the gas and lowering the temperature thereof to provide a cooled gas stream entering the heat exchanger;
refueling the fuel tank with the liquid fuel, and selectively removing the gaseous fuel from the fuel tank during refueling through the gaseous line, and removing the liquid fuel from the fuel tank through the liquid fuel delivery line so that heat is exchanged between the gaseous fuel flowing in the gaseous fuel line and the liquid fuel flowing in the liquid fuel delivery line.

18. A method as set forth in claim 17 wherein the liquid fuel delivery line is constructed and arranged to flow the liquid fuel after heat exchange back into the fuel tank.

19. A method as set forth in claim 17 wherein the liquid fuel delivery line is constructed and arranged to flow the liquid fuel through a fuel rail connected to a combustion engine and after heat exchange back into the fuel tank.

20. A method as set forth in claim 17 further comprising operating the combustion engine during the refueling.

21. A method of operating a fuel supply system for an internal combustion engine comprising: delivering a liquid fuel through a liquid fuel feed line to an injection fuel rail on an internal combustion engine and back to a fuel tank through a liquid fuel return line and selectively removing a gas from the fuel tank through a gaseous fuel line and exchanging heat from the gas flowing through the gaseous fuel line with liquid fuel flowing in one of the liquid fuel feed line or the liquid fuel return line wherein the gaseous fuel line contains a throttling valve directly upstream of a heat exchanger constructed and arranged to expand the gas flowing in the gaseous fuel line thereby cooling the gas and lowering the temperature thereof to provide a cooled gas stream entering the heat exchanger.

22. A method as set forth in claim 21 further comprising adiabatically expanding the gas flowing in the gaseous line to cool the gas prior to exchanging heat.

23. A method comprising controlling the temperature and pressure of a liquid gas tank, including removing a liquid fuel from the liquid gas tank through a liquid fuel feed line to a liquid injection fuel rail of an internal combustion engine and back to the liquid gas tank through a liquid fuel return line, and when the temperature and/or pressure of the liquid gas tank exceeds a predetermined level, selectively removing a gas from the liquid gas tank through a gas line and exchanging heat from the gas flowing through the gas line with the liquid fuel flowing through at least one of the liquid fuel feed line or the liquid fuel return line wherein the gas line contains a throttling valve directly upstream of a heat exchanger constructed and arranged to expand the gas flowing in the gas line thereby cooling the gas and lowering the temperature thereof to provide a cooled gas stream entering the heat exchanger.

24. A method as set forth in claim 23 further comprising selectively expanding the gas flowing through the gaseous line to cool the gas therein prior to exchanging heat with liquid fuel flowing through the liquid fuel feed line or the liquid fuel return line.

25. A method as set forth in claim 24 further comprising delivering the gas removed from the liquid gas tank to the internal combustion engine and for combusting the gas in the combustion engine.

26. A system as set forth in claim 1 wherein the liquid fuel feed line includes a strainer at one end.

27. A system as set forth in claim 26 wherein the strainer has a portion thereof extending into the storage tank a distance sufficient to be submerged in the liquid fuel.

28. A system as set forth in claim 26 wherein the liquid fuel feed line includes a first fuel pump downstream of the strainer.

29. A system as set forth in claim 28 wherein the liquid fuel feed line includes fuel filter having a portion thereof extending into the storage tank a distance sufficient to be submerged in the liquid fuel.

30. A system as set forth in claim 29 wherein the fuel filter is downstream of the first fuel pump.

31. A system as set forth in claim 1 wherein a feed pressure control valve is connected to the liquid fuel return line and a first regulator is connected downstream of the feed pressure control valve.

32. A system as set forth in claim 1 wherein the gaseous line is connected to an oxidant or air inlet manifold of the combustion engine.

33. A system as set forth in claim 1 wherein the gaseous line does not contain any liquid.

34. A system as set forth in claim 31 further comprising a bypass line, comprising a second regulator connected thereto, connected to the liquid fuel return line at one end upstream of the feed pressure control valve and at the other end downstream of the first regulator.

35. A system as set forth in claim 1 wherein the heat exchanger is a shell and tube type and the gas is expanded to flow through the shell side of the exchanger and the liquid fuel may flow through the tube side.

* * * * *